July 9, 1940.  E. A. BRINER  2,206,874
PROPELLER CONTROL MECHANISM
Filed Nov. 14, 1936  4 Sheets-Sheet 3

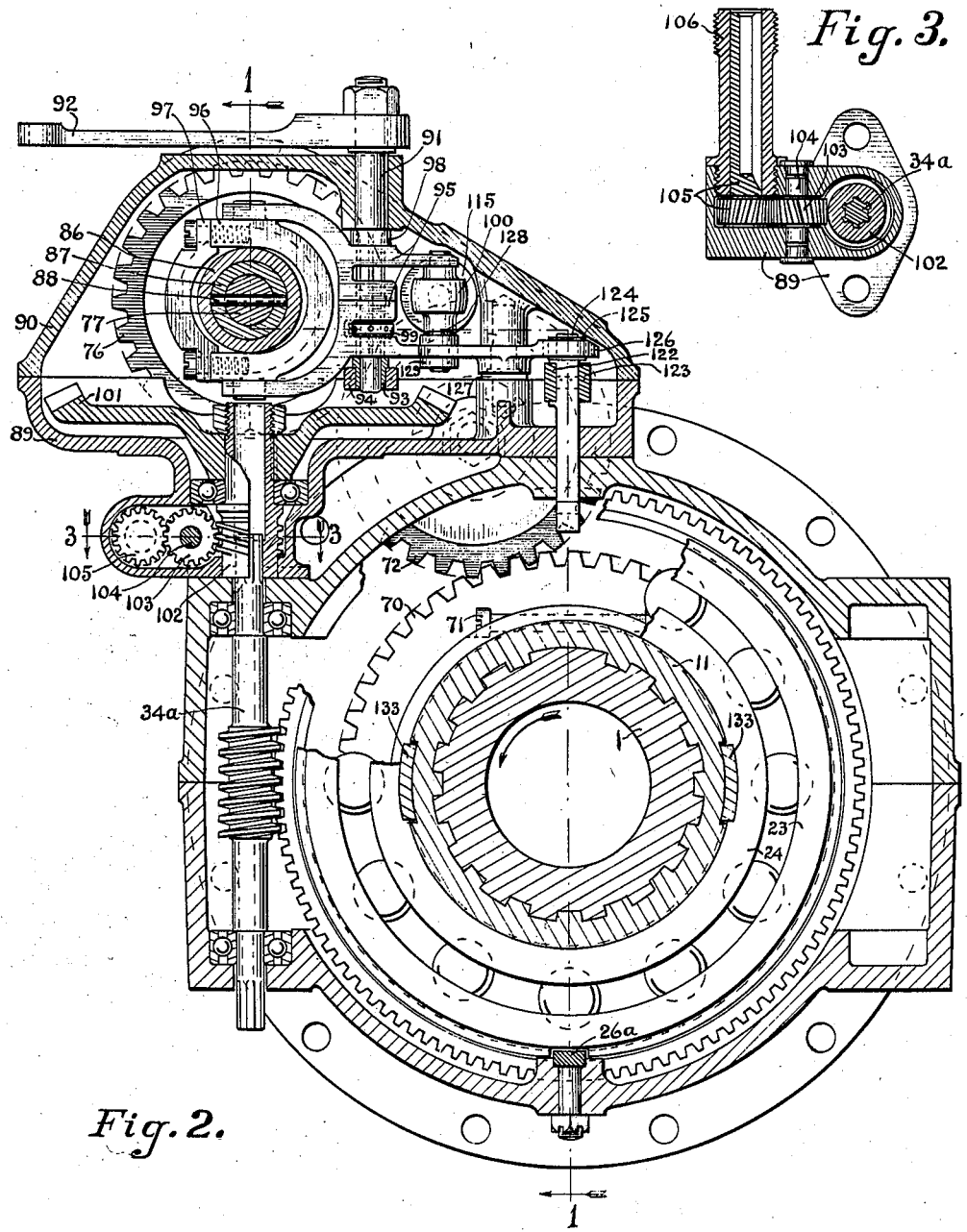

INVENTOR
Ernest A. Briner

July 9, 1940.　　　　E. A. BRINER　　　　2,206,874
PROPELLER CONTROL MECHANISM
Filed Nov. 14, 1936　　　4 Sheets-Sheet 4

INVENTOR
Emit A. Briner

Patented July 9, 1940

2,206,874

UNITED STATES PATENT OFFICE 2,206,874

PROPELLER CONTROL MECHANISM

Emil A. Briner, East Orange, N. J., assignor to Aero Engineering Corporation, East Orange, N. J.

Application November 14, 1936, Serial No. 110,796

8 Claims. (Cl. 170—163)

This invention relates to improvements in auxiliary propeller control mechanism applicable to aircraft, or its engines; for shifting the pitch of propeller blades in flight, utilizing engine power at will to affect the pitch change. The engine power may also be used to supplement hand control, or vice versa. There may be various possible forms of the device.

For one specific instance of such application, reference is made to my former U. S. patents on aircraft propellers, No. 1,890,932; No. 1,982,-283; and No. 1,982,284; in which a hand crank in the pilot's cockpit sufficed to change the pitch of the blades, in which construction a motor could be used to replace the hand crank for shifting the pitch of larger propellers with any available power.

However, the substitution in such former constructions, of a compressed air, electric, or hydraulic motor for hand operation introduces complications that are preferably to be avoided. With abundant engine power at hand in the engine shaft, inventors have repeatedly resorted to devices to utilize a bit of the engine power to shift the pitch of the blades with the engine in operation. Thus the broad principle is not new. Of course, with aircraft engines becoming larger each year, power operation of some sort becomes advantageous, or necessary.

More specifically, in U. S. Patent 1,190,328 of July 1916, Sacerdoti discloses an engine shaft drive for adjusting the pitch of marine propellers by means of differential gears and a jaw clutch. Other aircraft patents have disclosed devices for similarly utilizing engine power to change the pitch of the blades.

The weakness in many of these former aircraft devices appears to be the functional requirement of throwing some vital part of the mechanism "in" and "out" of gear at high speed. In general they look plausible on paper, can operate while new in practice, but wear out rapidly and sometimes dangerously. So the objects of safety, economy, and commercial success, can hardly be said to have been attained for such structures. The fundamental practical elements have been lacking.

So the first object is to provide a construction in which the gear teeth are always in mesh. They must not be thrown "in" and "out" of gear at high speed.

The second object is to provide a mechanism to change the pitch, or even reverse the pitch from one extreme to the other in a small fraction of the time required to do it by hand. To execute the pitch change quickly, enables coordination with a quick maneuver of the airplane. My object is a direct gear drive, not a differential gear drive, which is slow and complicated.

A third object is compactness, and light weight, providing an enclosed mechanical motor of less size, and weight, than an equivalent electric motor. Said mechanical motor to be practically a separate unit operable without hand power, or co-operative therewith.

A fourth object is to provide a separate high speed shaft, reliably mounted on ball bearings, in continuous operation; so that such continuous operation with the engine, serves as a "mechanical motor," of exceptionally high efficiency running at "no load," and yet capable at a touch of the control to move the pitch mechanism one way or the other. The continuous operation of the "mechanical motor" with the engine is unique and characteristic.

A fifth object is incidental to the continuous operation of this "mechanical motor," namely to create a desirable flywheel effect to steady engine operation, and to overcome the extra load required to start moving the blades constrained by enormous centrifugal loads.

A sixth object is to provide continuous operation in my "mechanical motor" especially desirable at the outboard end of an aircraft engine, so that the device is continuously warmed, and exercised, ready for unfailing instant operation regardless of how cold the air may be. The slight warming of an idling multiple disc clutch enhances instant operation regardless of outside temperature, whether 100 degrees above zero or 50 degrees below zero, Fahrenheit. In other words, the enclosed mechanical motor embodies self-cooling in hot weather, and self-warming in very cold weather.

A seventh object is to provide a pitch limit that actually throws one's actuating hand out of operation at either end of the pitch range. This "throw back" is not only an automatic "clutch throw out" but it signals the operator instantly, even in the dark, when the pitch limit is reached. This insures safe operation even under the circumstances of careless, or rough, handling.

An eighth object is to broadly attain all the above, while retaining the features of my former hand operated devices for self-locking the blades in any position, keeping the engine shaft outside the propeller hub, accurate pitch indication, total enclosure, self lubrication, and requiring no special engine construction to adapt the device to standard aircraft engines. Even the former hand control is co-ordinate with the "mechanical motor."

A ninth object is to devise somewhere in the casings, a lateral tunnel for a train of relatively large gears driving my "mechanical motor" in connection with standardized engine shafts, and nose plates; without sacrificing the strength of said tunneled casings, or any bolt, or stud, available for attachment of my pitch shift mechanism, to said engines.

In using engine shaft power heretofore, reliance has been placed upon a great force available from the engine shaft, and using the principle of reducing same to a slow speed in the transmission. That reduction makes the power equation equal high force times slow speed. My ninth object involves the principle of power using low force at high speed.

An incidental object is to provide an improved connection between the flanged shaft sleeve on the engine shaft and the propeller. This flanged shaft sleeve, and the surrounding intermediate gear, is characteristic of my development.

The auxiliary "mechanical motor" may be adapted for driving auxiliary aircraft devices connectible by flexible shaft to its shaft outlet; for example, a hoist for raising and lowering a landing gear or anchor, a heating and ventilating fan, de-icing pumps etc. A multiple arrangement of said mechanical motor is feasible as becomes apparent later by reference to Fig. 2. Adaptation to other auxiliaries secures the fundamental simplicity, and fuel economy, inherent in a driving connection with an aircraft engine.

Other objects, including desirable fundamental constructions, will become apparent in the following detailed description.

The invention consists of the devices, combinations, and assembly of parts hereinafter described and claimed including ruggedness, compactness, convenience, serviceability, accessibility, safety, etc.

An illustrative embodiment of the propeller control mechanism is shown in the accompanying drawings in which:

Fig. 2 is a transverse cross section taken about on the line 2—2 of Fig. 1. In both these views parts are broken away, or shown solid, to better show the relation to each other and illustrate the function of each part.

Fig. 3 is a cross section on the line 3—3, in Fig. 2, showing a connection for a "tachometer shaft" going to a pitch indicator.

Figure 1:
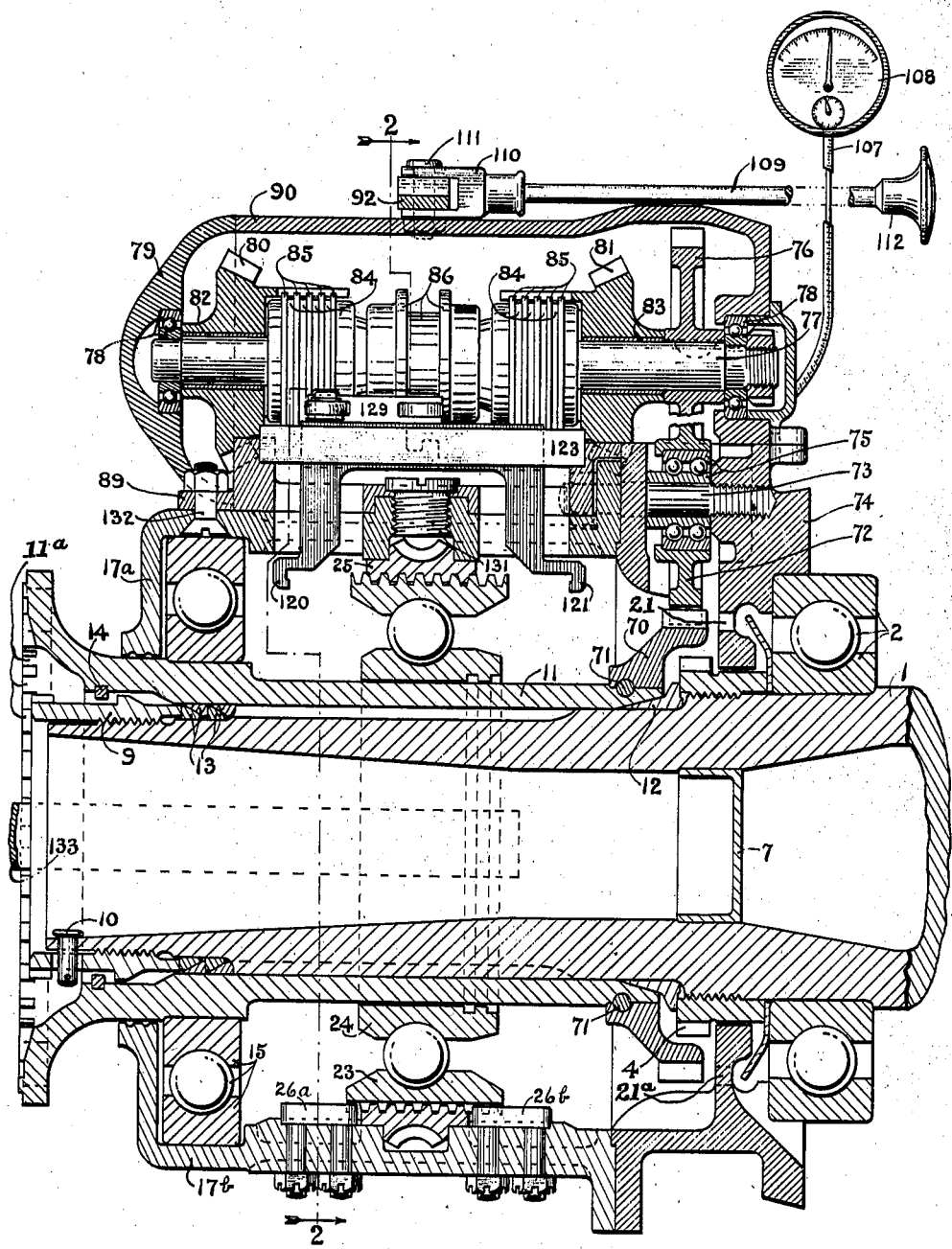
Fig. 1 is a longitudinal cross section of the pitch control mechanism showing the end of an engine shaft at the center line of the engine, with another longitudinal cross section of an auxiliary mechanical motor shown in a plane behind it in correct relation thereto. The cross-section is taken about as shown by the irregular dash and dot line 1—1 of Fig. 2.

In Figs. 1 and 2, fine cross section lining indicates improvements covered by this patent application, whereas coarse cross section lining illustrates parts covered by my patents previously mentioned; but necessary to show in co-operation with the improvements. Where both fine and coarse cross section lining is used for a part, it indicates an improvement in the "fine" region indicated. This method of illustrating should make the present invention stand out clearly. Furthermore, I have used some old numbers taken from my U. S. Patent 1,982,284, to number corresponding old parts. The improvements covered by this application are given part numbers above number 69. Engine shaft, or propeller shaft, means the same.

Similar characters of reference are employed in the above described views, to indicate corresponding parts.

In Fig. 1, a standard end of an engine shaft 1, mounts a standard ball thrust bearing 2, and a standard slinger collar, both held rigidly by a standard engine shaft nut 4. Another nut 9, with safety pin 10, locks a splined shaft sleeve 11, firmly on said engine shaft with the aid of split cone rings 12 and 13. Spring ring 14 is the shaft sleeve puller ring for propeller nut 9. The main propeller hub, not shown, carrying the propeller blades is normally through bolted to the flanged shaft sleeve 11, at four bolt holes partly shown in Fig. 6. These holes in said shaft sleeve are preferably made a few thousandths larger than the bolts. This insures taking the major reactions of the engine drive on a series of teeth 11a, meshing with a corresponding series projecting from a separate propeller hub (not shown) for mounting blades of adjustable, or variable pitch. A ball bearing 15 helps to center the upper and lower halfs of gear casing 17a and 17b, respectively. With short overhung propeller shafts, the ball bearing 15 is preferably omitted. The lower half 17b, serves to embed the bolted guide keys 26a, and 26b, forming an interrupted key forming an axial guide for outer ball race 23 having a keyway in its threaded portion, see also Fig. 2. The interrupted key, 26a, 26b, permits rotation therebetween of a worm wheel ring gear threaded with an easy fit on an outer ball race 23, and turned in the gear casings 17a, 17b, by worm 34a (Fig. 2). Worm 34a has two splined ends, the upper one connected to the mechanical motor, and the lower end available for connection to a supplementary hand, or motor control.

Looking at Fig. 1, a helical spur gear 70 is pressed upon a flanged shaft sleeve 11, of an engine shaft, and fastened with key bolts 71. Said helical gear meshes with an idler helical gear 72, mounted on a combination stationary stud bolt axle 73, screwed into an engine adapter 74, holding the large shaft thrust bearing 2 of the engine nose cap, not shown. Said idler gear revolves on a double ball bearing 75, and meshes with gear 76, keyed to countershaft 77, turning on ball bearings 78, of which the one on the left is mounted in cap 79. This clutch shaft 77 runs freely in these ball bearings and normally runs idle within a double clutch whose outer cups, with integral bevel gears 80 and 81, are mounted on anti-friction bushings 82 and 83. As this double clutch is of a standard Pullmore multi-disc type, it is not necessary to describe in detail except to indicate that the inner discs 84, are slidable axially and keyed to the clutch shaft, while the outer discs 85, slidably key themselves into the cups of the bevel gears 80 and 81 mentioned above. This Fig. 1, shows shipper sleeve 86, for actuating the double clutch.

Referring to Fig. 2, we see this shipper sleeve 86, slidably mounted on clutch body 87, keyed by pin 88, to the countershaft. The mechanical motor base 89 has a top cover 90, swivelly mounting lever shaft 91, to which is keyed control lever 92. The lower end of said lever shaft is swivelly mounted on bushing 93, set in bridge piece 94. Said lever shaft is splined into a two piece yoke 95, swivelly mounting shift collar 96, completed by a cap 97, attached thereto. The lever shaft has a loose collar 98, and a small nut 99, threaded only on the splines. Said small nut 99, has only one purpose, to retain the lever shaft even for inverted flight of aircraft. Said two piece yoke also swivelly mounts a hardened roller pin 100. In the motor base is a bevel gear 101, keyed to a rotatable hollow vertical shaft 102, internally broach connected at its lower end to fit the splined worm shaft 34a (old number) whose upper and lower ends are splined respectively for "power" or "hand crank" operation. The latter is usually connected with a flexible shaft disclosed in former Patent 1,982,284. Gear 101, meshes continuously with clutch cup gears 80 and 81, previously mentioned, but is normally at rest.

Referring to Figs. 2 and 3, a small worm cut upon said hollow vertical shaft meshes with a spiral gear 103 mounted on an axial pin 104. Said spiral gear meshes with spiral gear 105, having an integral hollow journal stem showing a longitudinal slot. Said journal stem turns in a standard screw connection 106, made to connect with a standard flexible shaft 107, and pitch indicator 108, pictured in Fig. 1.

Referring to the top of Fig. 1, a light control rod 109, with a forked end 110, is connected by swivel pin 111, to control lever 92. For simplicity, the control rod is shown straight. Preferably a standard free working flexible device connects the control lever to control knob 112, located on an instrument board in the control cockpit. Said instrument board is also the preferred location of the pitch indicator previously mentioned.

A "push" on the control knob engages one of the clutches to shift the propeller blades in one direction; while a "pull" engages the other clutch, to shift the pitch of the blades in the other direction.

Figure 4:
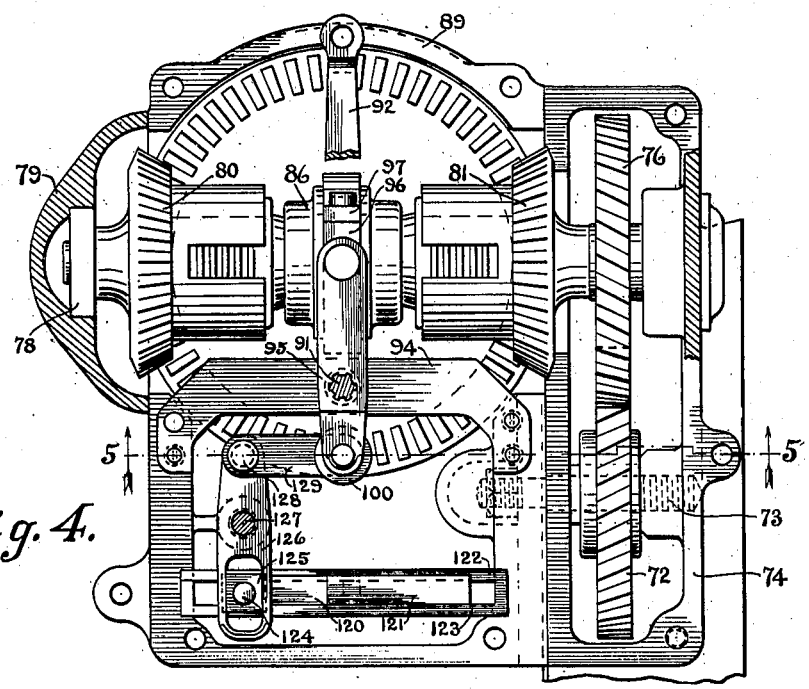
Fig. 4 is a plan view of the "mechanical motor" by itself, with nearly all of the top cover removed except a small section holding its shaft bearing on the right. A partial top view of the engine adapter forms the right hand portion of this plan view.
Figure 5:
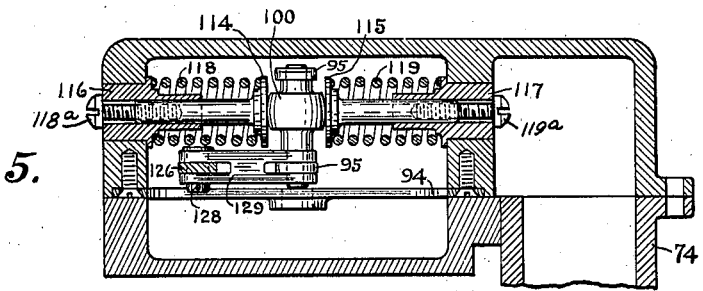
Fig. 5 is a vertical cross section about on the line 5—5, of Fig. 4, but not again showing any gears.

Referring to Figs. 4 and 5, we see the linkage, levers, springs, etc. of a mechanism for automatically releasing the contact of the multiple disc clutches, thus neutralizing the control whenever the "push" or "pull" is removed from the control knob in the cockpit. Furthermore, said mechanism serves the additional purpose of an actual "throw back." This "throw back" operates immediately to overcome the action of the control hand. It not only automatically signals the end of the pitch limit, but automatically assists the springs to put the double clutch into neutral position, whenever blades reach either end of the pitch range. These automatic characteristics are inseparable, inherent in the "throw back" mechanism.

As previously mentioned, control lever 92, swivels with shaft 91, splined to the double yoke 95, mounting rolling pin 100, which is constrained laterally by two flat top plungers 114 and 115, under the influence of guides 116 and 117, and two identical springs 118 and 119, lightly compressed. Said springs are compressed by adjusting screws 118a and 119a, tightly fitting into the plungers. The springs are given a fixed adjustment with about .003" allowed, between each plunger and the rolling pin. This avoids pinching said rolling pin. It may now be made to roll freely on either plunger. These two springs hold the rolling pin, the clutch yokes, the control lever, and consequently the multiple discs of the double clutch, in a strictly neutral position; in which the clutch countershaft, with its inner discs, simply runs idle. Therefore, no movement whatever is transmitted to the pitch shift mechanism. Nevertheless, a light disc friction in the idling position is advantageous; since it keeps the device just warm enough to prevent congealed oil in the whole mechanical motor, for example when outside temperatures are away below zero F.

This friction heat is stabilized by heat radiated from the base and top cover of my auxiliary mechanical motor. These parts of my motor enclosure are purposely exposed to the outside air. In a shop run, driving an extended countershaft by a pulley, with the clutch running idle at full speed the temperature rise of the top cover of said mechanical motor became stable at 45 degrees F. above the temperature of the surrounding air. Under such conditions, the device did not receive additional warmth anticipated when connected to an aircraft engine in actual use. This temperature rise of about 45 degrees, is essentially above any temperature rise produced by said device, when not having idling multiple disc friction clutches shown herein. In an official government test with a 700 horse-power engine, said temperature rise was 30 degrees above the surrounding air at 80 degrees F. in the propeller slipstream of a Briner propeller mounted in front of a Wright Cyclone engine attached to the test stand. Said temperature rise is inherently a mild co-operative heat, evolved by disc friction, in the present disclosure. In Fig. 5, the threaded portions at the ends of the flat top plungers 114 and 115, are for machine screws when compressing the springs in assembling; but may advantageously be left out of the completed structure as shown.

We now come to the "throw back" feature. Since the "mechanical motor" with its multiple disc clutches runs at high speed, it is capable of delivering considerably more power than the maximum required to shift the pitch of multiple propeller blades, in their most difficult position (when increasing the pitch of the blades at the high pitch angles). With limited high pitch angles the enormous power available from the engine, must not be suddenly checked so as to cause destructive friction, and wear, at the friction surfaces of the actuating clutch. Again, there is a strong likelihood of thus jamming the pitch changing mechanism at said high pitch limits, with a maximum condition at 45 degrees.

At the middle of Fig. 1 is shown a large ball bearing, having a threaded keywayed outer race 23, and a grooved keywayed inner race 24, which engages sliding skeleton keys 133 attached to a crosshead of any concentric pitch shift mechanism. Said inner race is also slidable axially along the large shaft sleeve. Said ball bearing is guided on keys. As shown in Figs. 1 and 2, a keyway prevents turning at the outer threaded portion of the ball race, as shown at the bottom of said figure. A threaded worm wheel engaging a worm (actuated selectively by mechanical motor, or other control, as previously mentioned) moves this large middle ball bearing to the right, or to the left, in shifting the pitch of the blades.

In Fig. 1, is shown a pair of irregular shaped fingers, 120 and 121, which are slidable in a slot in the motor base 89, and its adjacent casing. At their upper ends these fingers interlock in an S joint. The fingers are capable of sliding either way, from their mid-position as shown, along the two guide bars 122 and 123, of Figs. 2 and 4.

In Figs. 2 and 4, one of these interlocked fingers 120, has at its top an integral pin 124, moveable in a sliding bronze bushing 125, guided in an end slot of lever 126, mounted on pivot 127, and having a bearing pin 128, at the other end of the lever; thus forming a hinge joint with a link 129. The other end of said link forms a hinge joint with roller pin 100, previously mentioned. See also Fig. 5.

Therefore in Figs. 1, 4 and 5, it becomes evident that with right hand threading of worm and worm wheel, any movement of control lever 92 engaging either one of the clutches, results in a movement of the outer race of the large sliding ball bearing until contact with one of these fingers at one particular end of the pitch range will instantly "throw back" the control lever into the neutral position. Such "throw back" will leave the blades in the limit position at that end of the pitch range. This instant "throw back" prevents excessive friction, due to slippage under load, of the multiple discs of the clutches. At the same time, it mechanically signals the operator that the pitch limit has been reached. In the combination shown, with a positive friction clutch of abundant power at high speed, this "throw back mechanism" is a vital safety device to prevent damage of the friction contact surfaces, when using a friction contact mechanism.

Figure 8:
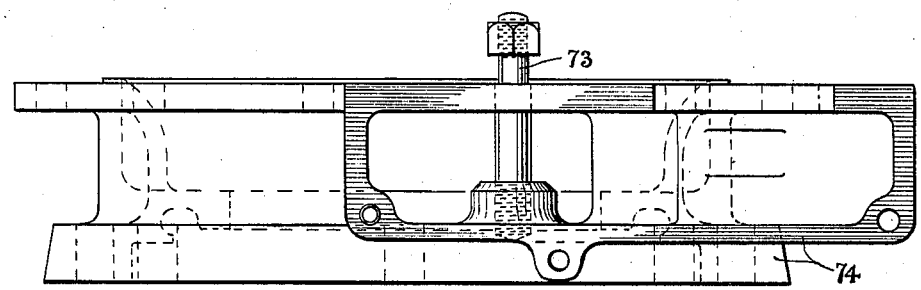
Fig. 8 is a plan view of the engine adapter shown in Fig. 7.
Figure 7:
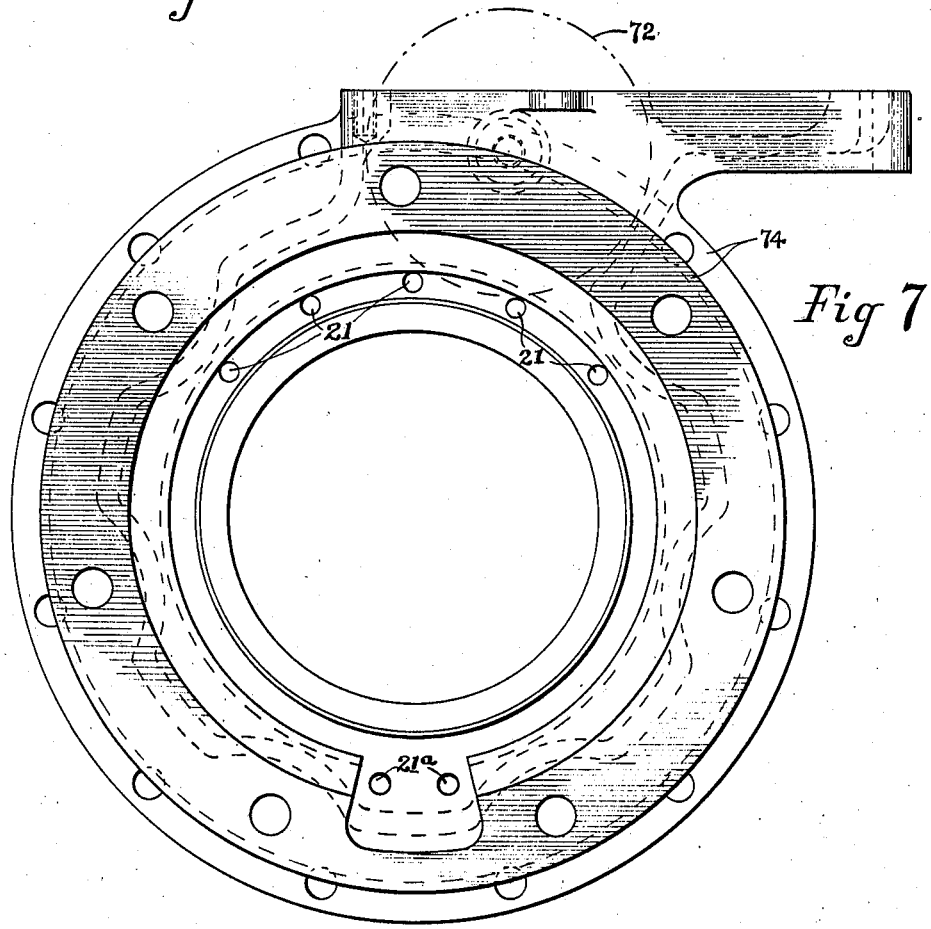
Fig. 7 is a vertical view of the engine adapter shown in Fig. 1, taken from the right.

Figs. 7 and 8 illustrate the engine adapter 74. Its form provides a double flange with a ring of bolt holes in each flange; one for attachment to the aircraft engine and the other for attachment to a supporting connecting case of my intermediate gear, located between the engine and the propeller. A series of small holes 21, are for oil vapor for lubrication coming from the engine crank case, disclosed in my previously mentioned patent. Likewise, small holes 21a, are for drainage of said oil back to the engine oil pump. The upper part of this engine adapter incorporates the novel feature of providing room for a gear transmission without weakening the structure as a support to the propeller. After disposing the corrugated body portion connecting the two flanges to let the gear transmission pass through, the structure would be weakened without the novel idea of using a combination, stud, stationary shaft, and bolt, to mount the idler gear; thus providing the means to make the gear transmission practical, for driving the countershaft rig carrying the double clutch etc., which I have named a "mechanical motor."

The phrases "electric motor" or "hydraulic motor" etc. are used quite commonly. The adjective serves to designate the power source. My "mechanical motor" uses mechanical power as its source, runs idle continuously, and when used converts in the neighborhood of 93% of the mechanical energy received into useful work; probably a much higher figure than is common for an electric hydraulic, or compressed air motor of similar capacity. The features that entitle the device to the name of mechanical motor, instead of being simply a countershaft, is its continuous operation ready for any load, its reversibility, its enclosure, and a high speed of about 3500 revolutions per minute, which is matched in other motors. The engine adapter helps to mount the mechanical motor. In Fig. 1, the screw plug 131, and the bolt 132, are special fastenings. All other fastenings by bolts, or studs, are indicated simply by holes in the parts without needing special designation.

Figure 6:
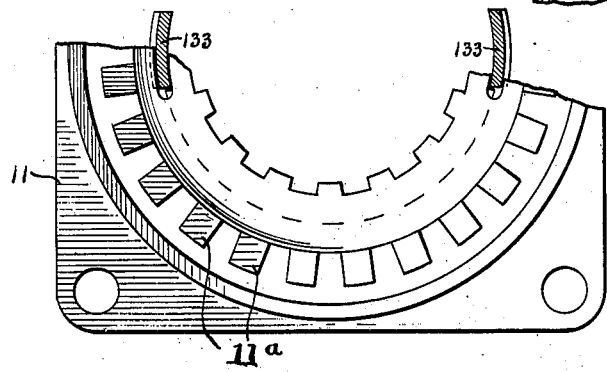
Fig. 6 is a broken vertical end view of the propeller coupling flange of the shaft sleeve taken from the left of Fig. 1, and illustrating a series of large dogs, or teeth.

Fig. 6 illustrates a broken view of a flange on the engine shaft sleeve. The "skeleton keys" 133, also in Figs. 1 and 2, lock themselves into the inner race of the large sliding ball bearing in the middle of the figures and communicate the pitch shift motion to the blades. The four coupling bolts, in the four corners of the flange, ordinarily would communicate the engine torque to the propeller hub. To relieve the various loads coming on the four corners of the flange of the engine shaft sleeve, and to better distribute the major portion of the engine torque to a separate propeller hub; an annular series of teeth are cut into the inner portion of said flange. The annular series of teeth 11a, formed upon the inner portion of the flange of said shaft sleeve, is an improvement on my former patents. These annular teeth, meshing with a corresponding series formed upon a separate hub, serves to transmit the engine power in a flared form substantially direct from the shaft sleeve to said hub. This leaves the corner flanges and bolts, to take care of primary attachment, and gyroscopic forces (when airplane maneuvers). With this arrangement it is possible to use smaller bolts, or use the combination for attaining about double the strength, due to bolts alone with minimum weight. In any event, the arrangement is useful as a safety device in cases where a propeller blade breaks, or suddenly tears loose in flight. While infrequent, such things have occurred. It results generally in the unbalanced propeller tearing away the engine from its mount, followed by total loss of control of the airplane. The idea back of my combination is to provide teeth that are strong for torque, but would still permit such an overwhelming unbalance in the propeller to tear itself loose at said bolts, without tearing away the engine; thus making it possible to retain the balance, and control, of the plane for a probable safe landing. The idea is novel and worthy of use, not only by controllable pitch propellers but by any of the so-called adjustable pitch type. In these others, the hub surrounds the shaft, and when a blade breaks and the propeller "goes" there is no possibility of merely breaking the engine shaft. My device, in this respect, is intended to save human life in such a contingency.

I give a practical instance of just the radial centrifugal force acting upon one airplane blade. In normal use this force is balanced by the other blade, or blades. In a propeller ten feet in diameter, with blades of aluminum alloy, the centrifugal load alone, acting on one blade, at full power is often 100,000 pounds when running with a direct connected engine at 2000 revolutions per minute. In the museum at Wright Field, Dayton, Ohio, there is exhibited a standard eight inch steel I beam, that was sheared completely in two, when a certain hollow steel blade let go on the test rig, probably at overload.

In operation with the engine running, the transmission gears 70, 72 and 76, run continuously. They turn the double clutch shaft at about 1.75 times the speed of the engine shaft. That means 3500 revolutions per minute for the mechanical motor when the aircraft engine runs 2000. This countershaft and double clutch run idle so that bevel gears, 80 and 81, remain perfectly still. The flywheel effect, of this high speed mechanical motor, is an important factor in overcoming the inertia of the pitch shift mechanism without shock. The effect somewhat resembles the effect of high speed inertia starters in starting an aircraft engine; but the latter uses shock, more or less detrimental to the mechanism connected. Upon pushing the control knob 112, the lever 92 is moved to the left, sliding shipper sleeve 86, so as to engage the clutch with bevel gear 80, thus rapidly revolving gear 101, which moves worm 34a turning the worm wheel. Said worm wheel has right hand threaded engagement with the large middle ball bearing sliding on the shaft sleeve, until said ball race contacts the "throw back" finger 121, at the pitch limit. In the meantime, the large middle ball bearings whose inner race slides along on the shaft sleeve, pulls the pair of skeleton keys 133, to the right to increase the pitch of the propeller blades.

The connections of the skeleton keys, with the pitch changing mechanism in the adjoining propeller hub, are clearly shown in my former U. S. Patent 1,982,284. When the outer ball race contacts the "throw back" finger 121, it moves the interlocked finger 120 at the same time, which in turn has connection with lever, link, double yoke, rolling pin etc.; which mechanism instantaneously reverses the control knob "push" thus automatically signaling the operator, and throwing back the clutch shipper sleeve into its original neutral position. If the operator wishes only a partial change in the pitch of the blades, he may make his "push" on the control knob either sharp, brief, or longer, to get the pitch desired on the pitch indicator as already described. In such a case, the spring 119, compressed by the push, restores the double clutch to the neutral position. The pitch indicator accurately shows the pitch of the blades at all times. Again, the pitch of the blades may be altered at full throttle to get any desired revolutions per minute on the engine, as recorded on the usual engine tachometer in the control cockpit. Whenever the hand is removed from the free working control knob, the springs automatically throw the clutch back to "neutral" in a gentle manner; whereas the "throw back" mechanism at either pitch limit gives a definite signal action that cannot be mistaken, or overcome by the full force of one's arm. Figs. 1 and 2, 4 and 5 show the pitch shift mechanism in its central position, and the mechanical motor in its "neutral position."

Likewise, the pitch can be decreased by the action of a "pull" on the control knob with similar effects. Any intermediate positions are available over the entire pitch range, the device being self-locking in any position in either direction. With the mechanism shown, it is possible at full speed of the engine, say 2000 revolutions per minute to go from one end of the pitch range to the other in less than ten seconds. This might mean a pitch range of 12, 24, 30 or more degrees, depending upon the spline angles embodied in the herring bone splines, as described in U. S. Patent 1,982,284, previously referred to. It makes no difference whether the pitch range includes all positive, or both positive and negative angles of pitch. The latter are desirable to reverse the movement of a plane on the water, or to check a landing run on the ground.

The large ball bearing 15 may be omitted, so as to make room for gear train 70, 72 76, at the outboard end of shaft sleeve 11, thus saving weight.

In accordance with the patent statutes, only one specific embodiment of the invention has been described and illustrated. However, it will be understood that the scope of the invention is not limited thereto, but is defined in the appended claims.

I claim:

1. A propeller assembly comprising a propeller shaft, sleeve, and hub, blades mounted therein for pivoting about their axes, an auxiliary "mechanical motor" comprising, a parallel countershaft mounted in anti-friction bearings, a non-rotatable motor case supporting said bearings, a gear attached to said countershaft, a gear train from the propeller shaft in mesh with said first mentioned gear, a pair of opposed bevel gears loose on said countershaft, a pair of friction clutches on said countershaft associated with said opposed bevel gears, said friction clutches including in part a clutch body, a shipper sleeve with yoke and lever, either of said pair of bevel gears selectively engageable with said countershaft by actuation of one of said clutches, a gear case, a worm shaft, a third bevel gear in mesh with said opposed bevel gears, and attached to said worm shaft, said worm shaft mounted in bearings in said gear case, a worm wheel in mesh with said worm shaft, and means actuated by said worm wheel for varying the pitch of said blades.

2. Mechanism auxiliary to a propeller assembly comprising a propeller shaft, a hub drivably connected with said propeller shaft, a plurality of propeller blades pivotally mounted in said hub, said mechanism, called a "mechanical motor," comprising a non-rotatable case, bearings mounted therein, a countershaft arranged to be positioned parallel to the propeller shaft, a gear train for continuously driving said countershaft from said propeller shaft, two opposed idler bevel gears on said countershaft, two friction clutches normally constrained in neutral position but associated with said idler bevel gears to selectively drive either of said idler bevel gears from said countershaft, a worm shaft, a third bevel gear in mesh at its opposite sides with said idler bevel gears, said third bevel gear attached to said worm shaft, and means for selectively actuating said clutches for driving said worm shaft by propeller shaft power, whereby the pitch of the blades may be changed by propeller shaft power.

3. Mechanism auxiliary to a propeller assembly comprising a propeller shaft, a hub drivably connected with said propeller shaft, a plurality of propeller blades pivotally mounted in said hub, said mechanism, called a "mechanical motor," comprising a non-rotatable case, bearings mounted therein, a countershaft arranged to be positioned parallel to the propeller shaft, a gear train for continuously driving said countershaft from said propeller shaft, two opposed idler bevel gears on said countershaft, two friction clutches normally constrained in neutral position but associated with said idler bevel gears to selectively drive either of said idler bevel gears from said countershaft, a worm shaft, a third bevel gear in mesh at its opposite sides with said idler bevel gears, said third bevel gear attached to said worm shaft, means on said worm shaft for connecting it with a means for operating it by hand power, and means for selectively actuating said clutches for driving said worm shaft by propeller shaft power, whereby the pitch of the blades may be changed by hand power or propeller shaft power.

4. In a propeller assembly comprising a propeller shaft casing, a hub, a plurality of propeller blades mounted in said hub for pitch change: an adapter for supporting a casing for a mechanical motor, a casing for a mechanism for transmitting power from the said motor to the blades for changing their pitch, and a gear train for driving said motor from the propeller shaft, said adapter comprising a hollow body portion, a pair of flanges extending at right angles to the axis of the propeller shaft, for attachment of the propeller shaft casing and said casing for the power transmitting mechanism, a third flange integral with the periphery of said body portion between said pair of flanges and at right angles to a plane containing the axis of the propeller shaft, and an axle supported by the adapter for mounting a gear of the gear train.

5. In a propeller assembly comprising a propeller shaft casing, a hub, a plurality of propeller blades mounted in said hub for pitch change: an adapter for supporting a casing for a mechanical motor, a casing for a mechanism for transmitting power from the said motor to the blades for changing their pitch, and a gear train for driving said motor from the propeller shaft, said adapter comprising a hollow body portion, a pair of flanges extending at right angles to the axis of the propeller shaft, for attachment of the propeller shaft casing and said casing for the power transmitting mechanism, a third flange integral with the periphery of said body portion between said pair of flanges and at right angles to a plane containing the axis of the propeller shaft, a stud bolt axle rigidly anchored at its ends in the adapter to mount an idler gear in the aforesaid gear train.

6. An auxiliary reversible "mechanical motor" capable of using propeller shaft power and connectible with a pitch changing mechanism for increasing or decreasing the pitch of the blades of a variable pitch propeller, said "mechanical motor" comprising: a non-rotatable motor case connectible with the propeller shaft casing, a shaft mounted in said motor case assemblable parallel to the propeller shaft, a gear train adapted for continuously driving the motor shaft from said propeller shaft, two idler gears on said motor shaft, two friction clutches and means including a lever for actuating one of said friction clutches, to selectively drive either one of said idler bevel gears from said motor shaft, a worm shaft, a third bevel gear in mesh at its opposite sides with each of the idler bevel gears, said third bevel gear attached to said worm shaft, said worm shaft connectible with the pitch changing mechanism.

7. An auxiliary reversible "mechanical motor" capable of using propeller shaft power and connectible with a pitch changing mechanism for increasing or decreasing the pitch of the blades of a variable pitch propeller and arrangeable for limiting the pitch range of the blades, said "mechanical motor" comprising: a non-rotatable motor case connectible with the propeller shaft casing, a shaft mounted in said motor case assemblable parallel to the propeller shaft, a gear train adapted for continuously driving the motor shaft from said propeller shaft, two idler gears on said motor shaft, two friction clutches and means including a lever for actuating one of said friction clutches, to selectively drive either one of said idler bevel gears from said motor shaft, a third bevel gear in mesh at its opposite sides with each of the idler bevel gears, a worm shaft, said third bevel gear attached to said worm shaft, said worm shaft connectible with the pitch changing mechanism, and means including a pair of fingers projecting beyond the motor casing, guides adapted for slideably mounting said fingers, contactable with a ball bearing, slidable on the propeller shaft, said fingers operably connected by linkage and other means including a roller pin to the lever for disengaging one of the aforesaid friction clutches at either limit of the pitch range.

8. An auxiliary reversible "mechanical motor" capable of using propeller shaft power and connectible with a pitch changing mechanism for increasing or decreasing the pitch of the blades of a variable pitch propeller, said "mechanical motor" comprising: a non-rotatable motor case connectible with a propeller shaft casing, a motor shaft mounted in said motor case assemblable parallel to the propeller shaft, a gear on said motor shaft adapted for continuously driving the motor shaft by a gear train from said propeller shaft, two idler bevel gears on said motor shaft, two opposed friction clutches associated therewith, means including in part a lever, a roller pin, a spring, and a plunger for holding said clutches in a neutral position, a third bevel gear, said idler bevel gears adaptable to selective engagement at opposite sides with said third bevel gear, a shaft driven by said third bevel gear, which is the prime element of a pitch changing mechanism.

EMIL A. BRINER.